United States Patent

Baumgartner et al.

[11] Patent Number: 5,250,611
[45] Date of Patent: Oct. 5, 1993

[54] PREPARATION OF ABS MOLDING MATERIALS

[75] Inventors: Ehrenfried Baumgartner, Roedersheim-Gronau; Hermann Gausepohl, Mutterstadt; Rudolf H. Jung, Worms, all of Fed. Rep. of Germany

[73] Assignee: BASF Aktiengesellschaft, Ludwigshafen, Fed. Rep. of Germany

[21] Appl. No.: 857,135

[22] Filed: Mar. 25, 1992

[30] Foreign Application Priority Data

Mar. 27, 1991 [DE] Fed. Rep. of Germany ....... 4110009

[51] Int. Cl.⁵ ............................................. C08F 279/04
[52] U.S. Cl. ........................................ 525/52; 525/53; 525/316
[58] Field of Search ............................ 525/52, 53, 316

[56] References Cited

U.S. PATENT DOCUMENTS

| | | |
|---|---|---|
| 3,243,481 | 3/1966 | Ruffing et al. |
| 3,475,514 | 10/1969 | Nemphos et al. ................... 525/52 |
| 3,658,946 | 4/1972 | Bronstert et al. ................... 525/53 |
| 3,903,202 | 8/1975 | Carter et al. |
| 3,954,903 | 5/1976 | Kudo et al. |
| 4,011,284 | 3/1977 | Gawne et al. ....................... 525/53 |
| 4,016,221 | 4/1977 | Kudo et al. |
| 4,252,911 | 2/1981 | Simon |
| 4,311,803 | 1/1982 | Smith et al. ........................ 525/53 |
| 4,410,659 | 10/1983 | Lee et al. |
| 4,421,895 | 12/1983 | Echte et al. |
| 4,587,294 | 5/1986 | Matsubara et al. .................. 525/53 |
| 4,640,959 | 2/1987 | Alle .................................... 525/71 |
| 4,839,418 | 6/1989 | Schwaben et al. .................. 525/53 |
| 4,925,896 | 5/1990 | Matarrese et al. .................. 525/53 |

FOREIGN PATENT DOCUMENTS

| | | |
|---|---|---|
| 054141 | 6/1982 | European Pat. Off. |
| 067536 | 12/1982 | European Pat. Off. |
| 1745767 | 9/1970 | Fed. Rep. of Germany. |
| 2448596 | 4/1975 | Fed. Rep. of Germany. |
| 53-052592 | 5/1978 | Japan .................................. 525/53 |
| 1175262 | 12/1969 | United Kingdom ................ 525/53 |
| 2088884 | 6/1982 | United Kingdom ................ 525/52 |
| WO91/02008 | 2/1991 | World Int. Prop. O. |

OTHER PUBLICATIONS

JP Abstract 6 3199-717.
JP Abstract 6 3207-803.
JP Abstract 6 3207-804.
JP Abstract 5 4070-350.

Primary Examiner—Vasu S. Jagannathan
Attorney, Agent, or Firm—Keil & Weinkauf

[57] ABSTRACT

Impact-resistant polystyrene acrylonitrile (ABS) is prepared by free radical polymernation of monomeric styrene and acrylonitrile or equivalents thereof in the presence of preformed, dissolved polbutadiene as a grafting base, the solvents used being in particular ethylbenzene and, at least from time to time, the monomers, and phase inversion taking place when the process has progressed to a certain point, in two or more reaction zones, by a continuous process in which the first reaction zone is present at least in duplicate and is in the form of a stirred kettle in each case, so that one stirred kettle is operated batchwise and alternately with the other in such a way that the reaction mixture is polymerized until phase inversion is complete or the initiator has been consumed, and the particular kettle content is then fed continuously to a second reaction zone in the form of a tube reactor.

5 Claims, No Drawings

PREPARATION OF ABS MOLDING MATERIALS

The present invention relates to a continuous process for the preparation of impact-resistant polystryene acrylonitrile (ABS) whose dispersed rubber particles have diameters of less than 500 nm by mass or solution polymerization in two or more reaction zones, wherein a first reaction zone is operated as a stirred kettle, using a free radical initiator and, if required, a chain transfer agent (regulator).

For example, the following publications relate to continuous processes for the preparation of impact-resistant polystyrene which may be modified with acrylonitrile:
(1) U.S.A. Pat. No. 3,243,481
(2) U.S.A. Pat. No. 3,903,202
(3) DE-A-2 448 596
(4) EP-A-67 536
(5) U.S.A. Pat. No. 4,410,659
(6) EP-A-54 141
(7) JP-A-63 199 717
(8) JP-A-63 207 804
(9) JP-A-63 207 803
(10) JP-A-54 070 350.

The continuous preparation of ABS polymers, in particular in two or more reaction zones, is disclosed in (1) and (2). It is carried out at from 80° to 180° C.; in a subsequent devolatilization (removal of the solvent or of the monomer residues), higher temperatures are also used.

Another process for the preparation of ABS polymers is emulsion polymerization; this will not be discussed in detail here.

The mechanical properties of the ABS molding materials polymerized by mass or solution polymerization and of those prepared by emulsion polymerization are very similar. The advantages in the case of mass or solution polymers are in particular the low production costs (including higher effectiveness of rubber, no waste water) and the paler intrinsic color of the products, requiring less pigments for coloring. However, the disadvantage in comparison with the result of emulsion polymerization is a lower surface gloss, because the ABS polymerized by mass or solution polymerization has relatively large dispersed rubber particles. There has therefore been a number of attempts to overcome these deficiencies by appropriate modifications to the process and to prepare ABS by mass or solution polymerization in such a way that small rubber particles are obtained.

(3) describes a mass/suspension polymerization for an ABS polymer for the preparation of blends with polyesters. For the ABS component, particle sizes of from 500 to 2,000 nm are to be achieved. By using high initiator concentrations (cf. Example 1), rubber particles having a diameter of less than 1,000 nm are obtained. Apart from the fact that such ABS products are likewise not comparable with the molding materials prepared by emulsion polymerization (they have, for example, rubber particle diameters of less than 500 mn), this process cannot be applied to a continuous solution polymerization since the high reaction rate in conjunction with a relatively high conversion leads to caking in the reactors.

(4) describes a solution polymerization process which gives ABS products having a rubber particle diameter of from 200 to 500 nm if a rubber having a very low molecular weight is used and the rubber is precipitated by adding further acrylonitrile to the first reaction zone. The toughness of such ABS products is very poor since the rubber particles formed are scarcely filled with hard matrix. The effectiveness of the rubber is correspondingly poor and it would be necessary to use large amounts of polybutadiene rubber which is relatively expensive (because it is produced by anionic polymerization) in order to achieve sufficiently high impact strength.

(5) describes a continuous mass polymerization in an extruder using large amounts of acrylonitrile, which gives ABS products having a rubber particle diameter of from 10 to 500 nm. Because of the large excess of acrylonitrile, the rubber is quasi-precipitated; the resulting rubber particles have no hard matrix inclusions, leading to the abovementioned disadvantages. Moreover, polymerization in an extruder is a very expensive technology for large-scale industrial production.

The use of rubber having an extremely low solution viscosity (7) in a solution polymerization still gives rubber particles having a maximum diameter of 750 nm. However, the surface gloss of an ABS prepared in such a manner cannot compete with an ABS produced by emulsion polymerization, the rubber particles being too large. Owing to the low molecular weight of the rubber, the rubber particles obtained are poorly filled with hard matrix, leading to the disadvantages described above.

In (6), a rubber-like polymer having a low solution viscosity is used as an impact modifier for ABS. In the examples, the rubber-like polymer is described as a styrene/butadiene block copolymer. Average rubber particle sizes of from 500 to 600 nm are obtained. (8) to (10) likewise describe the use of a block rubber for the preparation of ABS having small rubber particles. However, the disadvantage is the high price of the block rubber, which cancels out the cost advantage of the mass or solution polymerization process.

It is an object of the present invention to provide a process which, using polybutadiene, leads to an ABS having small rubber particles, eg. rubber particles having a diameter of less than 500 nm, even in a continuous mass or solution polymerization process.

We have found that this object is achieved by dividing the reaction into an initial polymerization which is in principle batchwise and is carried out in a stirred kettle, ie. with back-mixing, and a postpolymernation in a tube reactor. The novel process is thus carried out in two or more reaction zones and furthermore essentially isothermally. In contrast to the known processes, however, the advantages of a batchwise polymerization are combined with those of a continuous polymerization in that polymerization is effected batchwise in the first reaction zone to a solids content at which phase inversion is definitely complete, and polymerization is ended in a second or further reaction zone, ie. is continued until the solids content reaches not less than 50%, preferably 70%. Complete consumption of the monomers is not important.

To enable the polymerization and the working up to be operated continuously overall, according to the invention, the polymerization in the first reaction zone is carried out in two or more alternately operated stirred kettles, and the prepolymerized kettle content in each case is fed continuously to a tube reactor.

For the sake of clarity and simplicity, the terms styrene, acrylonitrile and polybutadiene are generally used below, even when equivalents thereof are meant; the invention is not restricted in this regard.

The present invention therefore directly relates to a process for the continuous preparation of impact-resistant polystyrene (ABS) by free radical polymerization of monomeric styrene and acrylonitrile or equivalents thereof in the presence of preformed, dissolved polybutadiene as a grafting base, solvents used being in particular ethylbenzene and, at least from time to time, the monomers, and phase inversion taking place when the process has progressed to a certain point, in two or more reaction zones, wherein the first reaction zone is present at least in duplicate and is in the form of a stirred kettle in each case, one stirred kettle being operated alternately with the other stirred kettle or other stirred kettles in such a way that the reaction mixture is polymerized until phase inversion is complete or the initiator has been consumed, and the particular kettle content is then fed continuously to a further reaction zone in the form of a tube reactor.

Suitable monomers for the process are styrene and acrylonitrile in a ratio of from 90:10 to 60:40. Equivalent monomers, such as a-methylstyrene, o-, m- and p-methylstyrene, tert-butylstyrene and methacrylonitrile, can be used in a known manner instead of or together with styrene and acrylonitrile.

A particularly suitable rubber is polybutadiene of the medium or high cis type, having a weight average molecular weight of from 70,000 to 350,000. In principle, however, the process can also be used for block rubbers, for example of the styrene/butadiene type. The rubber is used in an amount of, preferably, from 3 to 30% by weight, based on the monomers.

Suitable free radical initiators are peroxides capable of grafting. Dibenzoyl peroxide, tert-butyl peroctoate, tert-butyl perbenzoate, tert-butyl perpivalate and tert-butyl perneodecanoate are particularly preferred. The initiator is used in an amount of from 0.01 to 0.5% by weight, based on the monomers, the amounts in each case being such that, taking into account the temperature and disintegration parameters, polymerization at any stage takes place until virtually complete consumption of the initiator.

Suitable chain transfer agents (regulators) are the commonly used mercaptans of 4 to 18 carbon atoms. n-Butyl mercaptan, n-octyl mercaptan and n- or tert-dodecyl mercaptan have proven particularly suitable. Where it is used, the mercaptan is employed in an amount of, generally, from 0.01 to 0.3% by weight, based on the monomers.

Suitable solvents are toluene, xylene, methyl ethyl ketone, tetrahydrofuran and, in particular, ethylbenzene. The stated solvents are used in amounts of from 2 to 25% by weight, based on monomers.

According to the invention, the polymerization in the first stage (in the stirred kettle) is carried out until phase inversion occurs, and a temperature of 90° C. is not to be exceeded. Preferably, the temperature is in general from 60° to 90° C.—depending on the curing agent used—the residence time (without emptying phase) being about 0.5–10, in particular 1–5, hours. The emptying time depends on the dimensions of the downstream tube reactors; they should each permit a residence time of 1–5 hours there, ie. a total of about 2–10 hours when two or more tube reactors are used. The amount of initiator gradually fed to the stirred kettles is in general from 0.01 to 0.5% by weight, based on the amount of monomers.

After the mixture leaves the stirred kettle, ie. in the course of the reaction in the tube reactor, in general no further initiator is added, but the invention is not restricted in this regard.

During the reaction in the tube reactor, on the other hand, a regulator is generally required; its amount is from 0.01 to 0.5% by weight, based on the original amount of monomers and depending on the type used.

During the polymerization, in particular after the preparation of the solution of the rubber or before the processing of the impact-resistant polymers obtained by the novel process, conventional additives, such as internal lubricants, antioxidants or uv stabilizers, and lubricants, fillers and the like, may be added to the reaction mixture in conventional amounts known to the skilled worker.

The advantage of the novel process is that a high degree of grafting of the rubber and a high grafting yield are achieved without there being any difficulties in the removal of heat, accumulations on the kettle or premature crosslinking. Another advantage is that products having a high impact strength and good translucence can be prepared in a controlled manner using one and the same rubber, depending on the reaction procedure.

Impact-resistant ABS polymers having particle diameters of less than 500 rim can be obtained by the novel process.

The molding materials obtained by the novel process can be processed by conventional thermoplastic methods, for example by extrusion, injection molding, calendering, blow molding, pressing or sintering; moldings are preferably produced by injection molding.

The physical characteristics used in the Examples and Comparative Experiments below were determined as follows:

The solution viscosity, SV, of the rubber is measured in a 5% strength by weight solution in styrene at 25° C.

The mean particle size is determined by evaluating electron micrographs.

The notched impact strength is measured, according to DIN 53,453, on moldings injection-molded at 230° C.

The amounts stated are based on general on the weight.

EXAMPLE 1

A suitable polymerization plant consists of the following components:

a) a 250 l rubber-dissolving container having an anchor stirrer,
b) a 250 l storage container having an anchor stirrer,
c) two 50 l stirred kettles having anchor stirrers, evaporative coolers and external wall cooling means,
d) two 30 l tower reactors connected in series (1100 Mm long and 220 mm wide) and having internal, horizontal, parallel levels of cooling tubes and a stirrer in each case between the cooling tubes,
e) gravity-fed gear pumps,
f) a conventional devolatilization unit
g) and a granulating apparatus.

18 kg of commercial polybutadiene (Buns® HX from Bayer AG, having a solution viscosity of 90 mpa.s and in the form of a 5% strength solution in styrene at 25° C.) are dissolved in 22.5 kg of ethylbenzene, 82.13 kg of styrene and 27.37 kg of acrylonitrile and pumped into a storage container from which the polymerization plant is fed. 40 l of rubber solution in each case are first pumped into one of the two stirred kettles and heated to 80° C. while stirring. 16 g of commercial tert-butyl perneodecanoate, as a 10% strength solution in ethylbenzene, are added in the course of one hour so that a solids content of 25% by weight is achieved in the course of 2 hours at a stirring speed of 150 revolutions per minute.

Since the half life of the initiator used is 8.6 minutes at 80° C., the reaction is substantially complete after 2 hours, owing to the dead end polymerization conditions (A.V. Tobolsky, J. Am. Chem. Soc. 80 (1958), 5927–5929, and 82 (1960), 1277–1280). The polymerization solution or dispersion is then conveyed at a speed of 12 l/h into the first polymerization tower (ie. tube reactor). While the first stirred kettle is emptied in this manner, the second stirred kettle is charged and is operated until a solids content of 25% by weight has once again been reached and inversion has taken place. This procedure is continued alternately with both stirred kettles until the stocks have been consumed.

In the first tower, a polymer solids content of about 45% by weight is obtained at 130° C. In the second, downstream tower, a solids content of 70% by weight is obtained at 146° C. Both towers are operated completely full. The continuous addition of tert-dodecyl mercaptan into the first polymerization tower regulates the molecular weight of the ABS and keeps it at conventional values, so that a flow according to DIN 53,735 of about 5 cm$^3$/10 min is achieved at 220° C./10 kp.

After the second tower, the polymer melt is devolatiliied and finally granulated. The throughput is 8.4 kg/h, based on the solvent-free ABS molding material.

The maximum particle size of the rubber is 400 nm. The notched impact strength $a_k$ of the molding material at 23° C. and −40° C. reached the following values:

| | | |
|---|---|---|
| $a_K$ | (23° C.) | 11 kJ/m$^2$ |
| $a_K$ | (−40° C.) | 6 kJ/m$^2$ |

EXAMPLES 2 AND 3

The experiment according to Example 1 was repeated using commercial polybutadiene of the Buna HX 529 C and Buna HX 565 types instead of Buna HX 500. ABS molding materials having the following properties were obtained.

| Rubber | Solution viscosity of the rubber [mPa·s] | Maximum rubber particle size of the ABS molding material [nm] | Notched impact strength at 23° C. [kJ/m$^2$] | Notched impact strength at −40° C. [kJ/m$^2$] |
|---|---|---|---|---|
| Buna HX 529 C | 170 | 500 | 12 | 7 |
| Buna HX 565 | 42 | 300 | 9 | 5 |

EXAMPLES 4 AND 5

The procedure described in Example 1 was followed, except that, instead of a temperature of 80° C. in the first reaction zone, polymerization temperatures of 70° and 90° C. were established. ABS molding materials having the following properties were obtained:

| Polymerization temperature in the first reaction zone | Maximum rubber particle size of the ABS molding material [nm] | Notched impact strength at 23° C. [kJ/m$^2$] | Notched impact strength at −40° C. [kJ/m$^2$] |
|---|---|---|---|
| 70 | 0.4 | 11 | 6 |
| 90 | 0.4 | 10.6 | 5.3 |

Comparison with Example 1 shows that the properties of the molding material are only slightly influenced by the polymerization temperature in the first zone.

COMPARATIVE EXPERIMENT 4

The properties of an ABS containing 17% by weight of polybutadiene and prepared by emulsion polymerization were investigated for comparison purposes.

For this purpose, a polybutadiene latex was prepared by polymerization of 62 parts of butadiene in the presence of a solution of 0.6 part of tert-dodecyl mercaptan, 0.7 part of a sodium C$_{14}$-alkylsulfonate, 0.2 part of potassium peroxodisulfate and 0.2 part of sodium pyrophosphate in 80 parts of water at 25° C. After the end of the reaction, a conversion of 99% had been reached and a polybutadiene latex whose mean particle size was 100 nm had been obtained. The latex was agglomerated by adding 25 parts of an emulsion of a copolymer of 96 parts of ethyl acrylate and 4 parts of methacrylamide having a solids content of 10 parts by weight, a polybutadiene latex having a mean particle size of 300 nm being formed. After the addition of 40 parts of water, 0.4 part of a sodium C$_{14}$-alkylsulfonate and 0.2 part of potassium peroxodisulfate, 38 parts of a mixture of styrene and acrylonitrile in a ratio of 70:30 were introduced in the course of 4 hours and polymerization was carried off at 75° C. while the batch was stirred. The conversion, based on stryene/acrylonitrile, was virtually quantitative. The graft rubber dispersion obtained was precipitated by means of calcium chloride solution, and the isolated graft copolymer was washed with distilled water. The moist graft rubber was mixed with separately prepared polystyrene acrylonitrile (intrinsic viscosity=80.7 ml/g, acrylonitrile content=25% by weight) in a twinscrew extruder with devolatilization, in a ratio such that the molding material contained 17% by weight of polybutadiene. The product properties are as follows:

| | | |
|---|---|---|
| Modulus of elasticity | [N/mm$^2$] | 2650 |
| Notched impact strength | | |
| at 23° C. | [kg/mm$^2$] | 11.0 |
| at −40° C. | [kg/mm$^2$] | 4.0 |
| Surface gloss | | |
| Condition 1 | [%] | 68.0 |
| Condition 2 | [%] | 47.0 |
| Rubber particle size d$_{50}$ | [μm] | 0.3 |
| Yellowness Index | | 32.8 |
| Intrinsic viscosity of the PSAN matrix | [ml/g] | 80.7 |

We claim:
1. A process for the continuous preparation of impact-resistant polystyrene acrylonitrile by free radical polymerization in two or more reaction zones, which comprises contacting 90 to 60 parts of a monomer selected from the group consisting of styrene, αmethylstyrene, o-methylstyrene, m-methylstyrene, p-methylstyrene and tert-butylstyrene, 10 to 40 parts of a mono- mer selected from the group consisting of acrylonitrile, and methacrylonitrile and 3-30% by weight based on the weight of the monomers of polybutadiene having a weight average molecular weight of 70,000-350,000 dissolved in a solvent therefor at a temperature of 90° C. or less and, for a time that phase inversion takes place, wherein the first reaction zone is present at lest in duplicate and is in each case, in the form of a stirred kettle being operated batchwise and alternately with the other in such a way that the reaction mixture is polymerized until phase inversion is complete or an initiator has been consumed, and the kettle content is then fed continuously to a second reaction zone in the form of a tube reactor.

2. A process as claimed in claim 1, wherein the residence time in the first reaction zone is from 0.5 to 10 hours.

3. A process as claimed in claim 1, wherein the ratio of the residence time in the first reaction zone to that in the second or any further reaction zone is from 1:0.5 to 1:5.

4. A process as claimed in claim 1, wherein the conversion in the stirred kettle is carried out until the consumption of monomer corresponds at least to the weight of the polybutadiene.

5. A process as claimed in claim 1, wherein the reaction in the stirred kettle is initiated by a tert-butyl peroxy compound.

* * * * *

UNITED STATES PATENT AND TRADEMARK OFFICE
CERTIFICATE OF CORRECTION

PATENT NO. : 5,250,611

DATED : October 5, 1993

INVENTOR(S) : BAUMGARTNER et al.

It is certified that error appears in the above-identified patent and that said Letters Patent is hereby corrected as shown below:

Claim 1, column 6, line 66, "αmethyls-" should read -- α-methyls- --.

Signed and Sealed this

Twenty-ninth Day of March, 1994

Attest:

BRUCE LEHMAN

Attesting Officer

Commissioner of Patents and Trademarks